April 13, 1926.

J. C. STANLEY ET AL 1,581,034

MANURE DRILL

Filed June 2, 1923    3 Sheets-Sheet 2

Inventors
J. C. Stanley and
R. A. Evans,

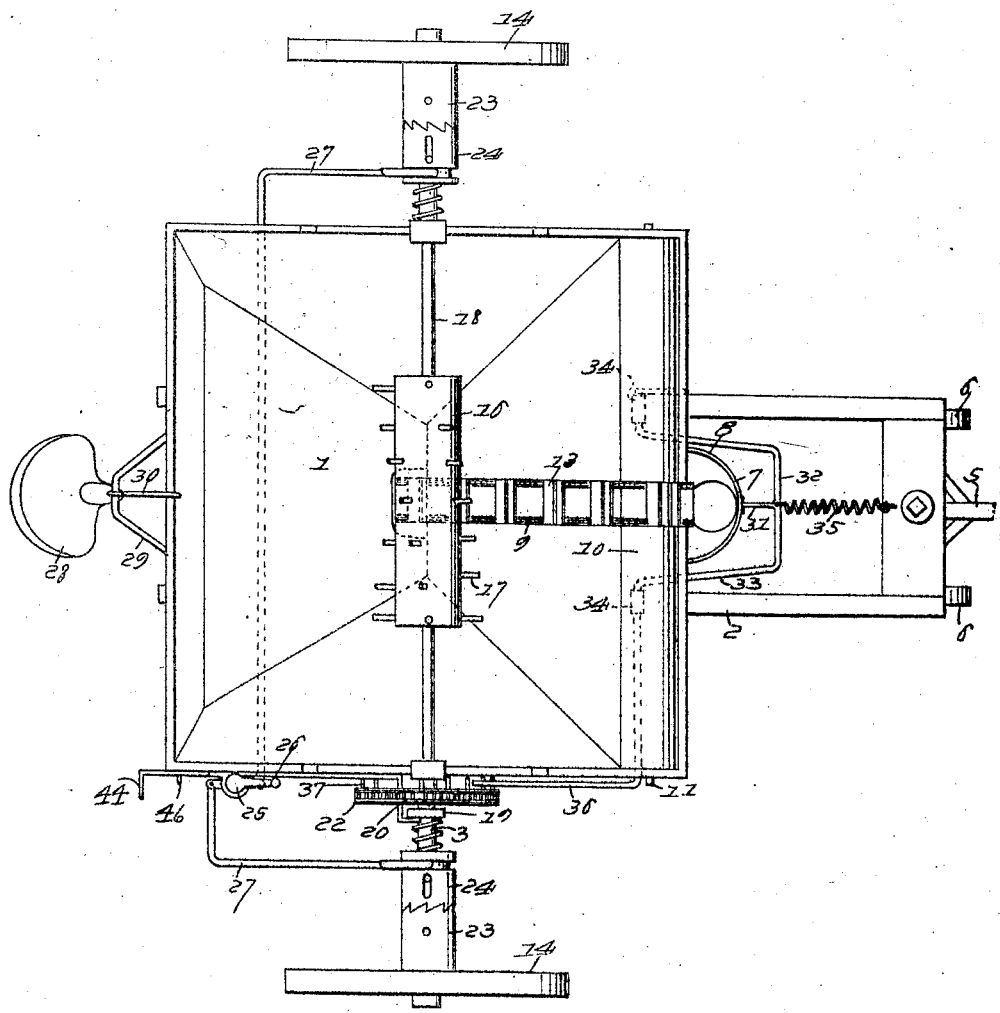

Patented Apr. 13, 1926.

1,581,034

UNITED STATES PATENT OFFICE.

JOHN C. STANLEY AND RICHARD A. EVANS, OF VIAN, OKLAHOMA.

MANURE DRILL.

Application filed June 2, 1923. Serial No. 642,956.

*To all whom it may concern:*

Be it known that JOHN C. STANLEY and RICHARD A. EVANS, citizens of the United States of America, residing at Vian, in the county of Sequoyah and State of Oklahoma, have invented new and useful Improvements in Manure Drills, of which the following is a specification.

The object of the invention is to provide a machine which is adapted to carry a quantity of manure for fertilizing purposes and deposit it in hills spaced apart any desired distance by means of adjustable mechanism carried by the machine, or to deposit it continuously in a line, the machine being provided with a pulverizing element by which the clots are thoroughly broken up so that the manure may be thoroughly mixed with the soil as it is turned under or pressed down by the covering disks or wheels with which the machine is equipped.

With this general object in view the invention consists in a construction and combination of parts of which a preferred embodiment is shown in the accompanying drawings, wherein:—

Figure 3 is a plan view.

Figure 4 is a perspective view showing the clutch mechanism by means of which motion may be transmitted from the main wheels to the drilling mechanism.

Figure 1:
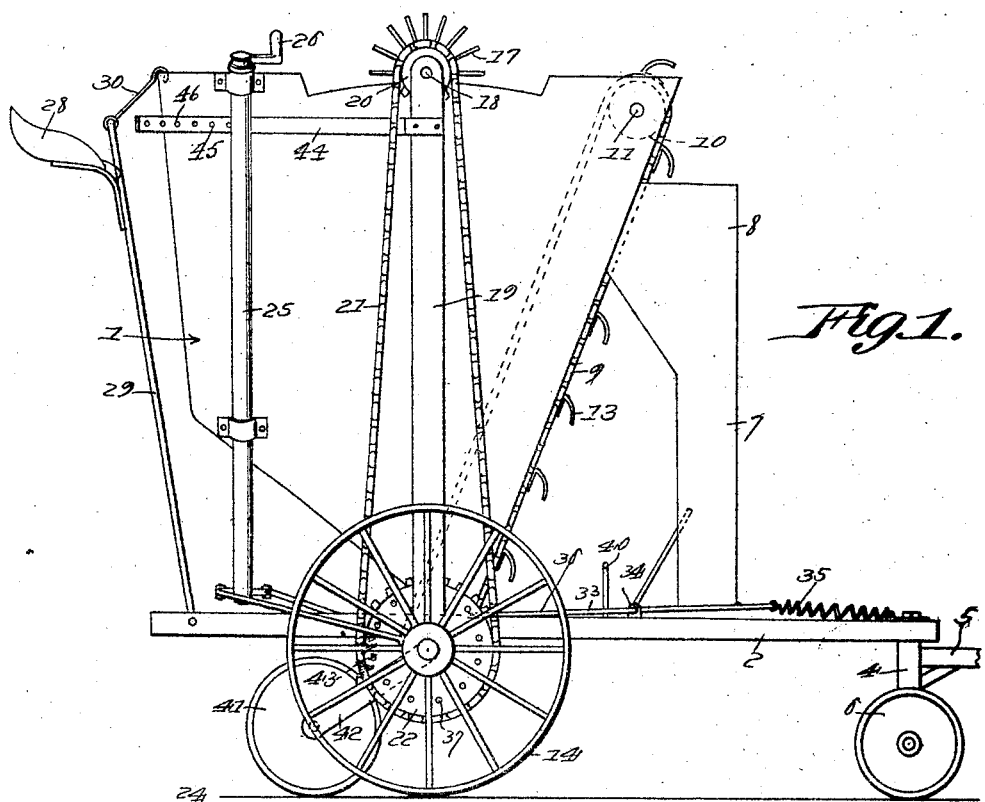
Figure 1 is a side elevational view of the invention.
Figure 2:
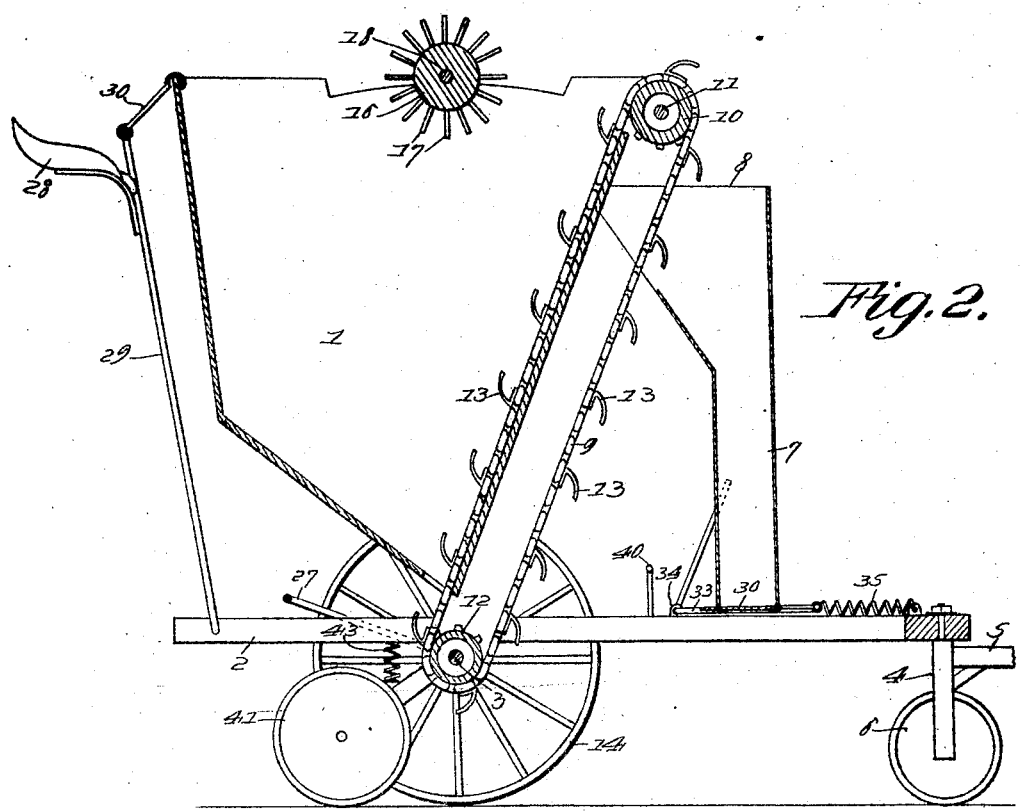
Figure 2 is a central vertical sectional view.
Figure 5:
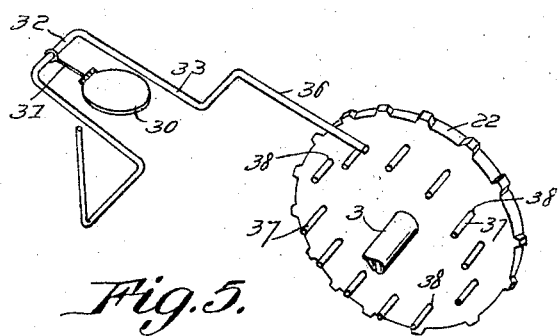
Figure 5 is a perspective detail view showing the chute door and the intermittent operating means therefor.

The hopper 1 which is formed with downwardly converging side, end and rear walls is mounted on a truck frame 2 provided with a transverse shaft 3 constituting an axle and with a forward pivotal truck 4 having a draft tongue 5 and wheels 6 by means of which the mechanism may be transported. On the forward wheel of the hopper there is carried a manure chute or spout 7 formed preferably of sheet metal and provided with an integral shield 8 which is secured to the hopper wall, an elevator belt 9 traversing an idler sprocket 10 mounted on a transverse shaft 11 carried at the upper end of the hopper and also traversing a sprocket 12 carried by the axle shaft 3, the elevator shaft being provided with shovels 13 spaced uniformly along the belt. When power is transmitted to the axle shaft by the turning of the ground wheels 14 by which it is supported, (through the instrumentality of clutch mechanism hereinafter described), the axle shaft is caused to rotate and with it the sprocket wheel 13 and the elevator belt 9 and the manure contained in the hopper is raised by the shovels and deposited in the chute or spout 7 to be dropped on the ground either in hills or in a continuous row, depending on whether the gate or door 15 with which the chute or spout is equipped at the lower end is opened intermittently or retained in open position, the gate being held continuously open or opened intermittently as desired by mechanism hereinafter described.

Prior to being deposited in the chute or spout 7 the manure is subjected to the pulverizing operation of a roll 16 equipped with teeth 17 arranged in spirals upon its periphery, the roll being mounted on a shaft 18 journaled at the upper extremity of a support 19 and motion being transmitted to it through the shaft by means of a sprocket 20 carried on the shaft and traversed by a chain 21 which also traverses a sprocket 22 mounted on the axle shaft 3.

The ground wheels 14 are normally rotatable on the axle shaft 3 but each on the inner face of its hub is provided with a clutch element 23 engageable with a complemental clutch element 24 slidably mounted on the axle but precluded from angular or turning movement with respect to the same. When the complemental clutch elements 24 are moved in a direction away from the clutch elements 23 on the ground wheels, the latter are free to rotate on the shaft and this rotary motion is not transmitted to the axle and hence the pulverizing roll and the elevator will remain relatively stationary but in the event of the clutch members 24 and 23 being engaged, the movement of the motion over the ground will also impart rotary movement to the axle and with it movement to the elevator belt and to the pulverizing roll. The means for actuating the clutch elements 24 consists of a vertical shaft 25 provided with a crank handle 26 by means of which angular or turning movement may be imparted to the shaft and at its lower end, on diametrically opposite sides, there are connected with it the shifter rods 27, universal connections being provided between the shifter rods and the shaft 25, so that on angular or turning movement of the shaft, longitudinal movement in opposite directions will be imparted to the shifter rod with the consequent engagement of the clutch members 24 with the clutch members 23.

Provision is made for the support of an operator at the rear of the hopper 1 and this consists of a seat 28 mounted at the upper extremity of a support 29 which consists of a stout rod bent to provide two upstanding legs of which the lower extremities are turned outwardly and pivotally engage in the sides of the frame 2, the seat being held in elevated position by means of a hook 30 connected with the rod at the point where it is bent back on itself and engaging an opening formed in the rear wall of the hopper adjacent the upper edge. Obviously disconnection of the hook will permit the lowering of the seat when occasion demands.

If the manure is to be deposited in hills, it is essential that the door or gate 15 at the lower end of the chute be intermittently operated and in order that this may be accomplished, the gate is provided with a rearwardly extending arm 31 which is connected to the intermediate portion 32 of the rocker yoke 33 which is journaled, as indicated at 34, on opposite sides of the frame, a spring 35 being secured to the frame and bearing portion 32 of the rocker yoke and tending to keep the gate in closed position. The yoke has extending from one journal an arm 36 which is adapted for engagement with tappet pins 37 selectively arrangeable in a series of uniformly spaced perforations 38 in the sprocket 22, so that upon impact of each point with the arm 36, rocking movement may be imparted to the yoke against the pressure of the spring 35, thus effecting intermittent opening movement of the gate 30 with the consequent deposit of a certain amount of manure depending on the length of time which the gate is held open. Obviously by the proper selection and spacing of the tappet pins 37, the time of opening of the gate may be determined and thus the desired spacing of the hills of manure. In the event that it is desired to continuously hold the gate in open position, the rocker yoke 34 has projecting from the opposite journal an upright arm 39 which may be engaged with a latch bar 40, carried by the hopper. The engagement of the latch bar with the arm 38 will obviously hold the intermediate portion of the yoke elevated and the gate in open position, so that the manure raised by the elevator will be continuously deposited in the chute or spout and dropped in a continuous row on the ground.

In order that the freshly deposited manure may be properly covered to save its strength in the soil for the growing crop, follower disks or wheels 41 are provided, these being carried at the extremities of arms 42 which are pivotally mounted on the axle shaft 3 and depressed at their soil carrying ends by means of springs 43, the covering disk being arranged in a pair of which the units are complemental to each other and cooperate to press the manure into the ground.

The pulverizing roll 17 is mounted for adjustment toward and away from the elevator belt and its attendant shovels, the supports 19 swinging on the axle as a pivot and being provided with adjusting means comprising a bar 44 formed with a plurality of perforations or openings 45 selectively engageable with a pin 46 carried on the outer side wall of the hopper 1, the bar having a spring tendency toward the side of the hopper and being disengaged from the pin by deflection away from the hopper.

Having described the invention, what is claimed as new and useful is:—

A machine for the purpose indicated comprising a hopper, a discharge chute or spout carried by the forward end of the hopper, an elevator traversing the hopper and discharging into the chute, a gate controlling the discharge from the mouth end of the chute, a pulverizing roll mounted at the top of the hopper in close proximity to the elevator, supporting members disposed on opposite sides of the hopper, the pulverizing roll having a shaft journaled in the upper ends of said supporting members and the latter being pivotally mounted at the axis of one of the elevator supporting rolls, and an adjusting bar carried by one of the supporting members and having a spring tendency toward the side wall of the hopper, said bar being provided with a plurality of holes and the hopper being provided with a pin with which said holes are selectively engageable, whereby the position of the pulverizing roll with reference to the elevator may be varied.

In testimony whereof they affix their signatures.

JOHN C. STANLEY.
RICHARD A. EVANS.